N. MACNEALE.
PROCESS OF ELECTRICAL WELDING.
APPLICATION FILED NOV. 21, 1910.
990,489.
Patented Apr. 25, 1911.
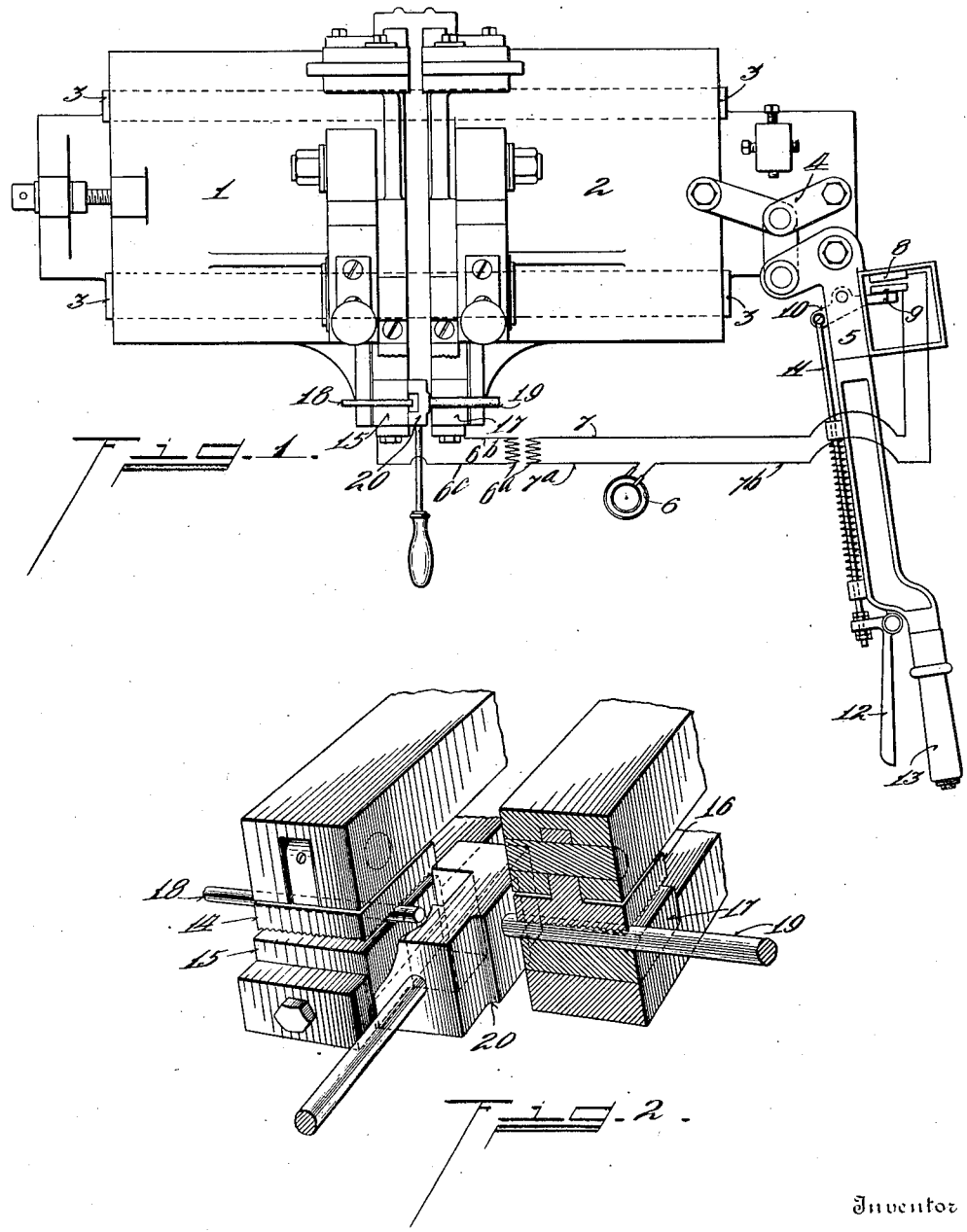

UNITED STATES PATENT OFFICE.

NEIL MACNEALE, OF CINCINNATI, OHIO, ASSIGNOR TO THE TOLEDO ELECTRIC WELDER COMPANY, OF CINCINNATI, OHIO, A CORPORATION OF OHIO.

PROCESS OF ELECTRICAL WELDING.

990,489.  Specification of Letters Patent.  Patented Apr. 25, 1911.

Application filed November 21, 1910.  Serial No. 593,416.

*To all whom it may concern:*

Be it known that I, NEIL MACNEALE, a citizen of the United States, residing at Cincinnati, in the county of Hamilton and State of Ohio, have invented certain new and useful Improvements in Processes for Electrical Welding, of which the following is a specification.

My invention relates to a process of electrically welding pieces of metal having different electrical resistance. One example of this usage is the forming of an electric weld between two pieces of the same metal, having different dimensions at their line of intended union, in which instance, the smaller piece, of course, would have the greater resistance, and would heat more quickly than the larger piece. Another example of such usage is the welding together of two pieces of different metal, one of which has a greater electrical resistance than the other.

The object of this invention is to form the weld through the agency of a single source of electrical energy, such as any ordinary heat transformer commonly used, without the use of a plurality of transformers, or a series of switches.

Another object of this invention is to produce a process which can be readily used in connection with ordinary commercial electric welding machines.

The essential step of the process is the preheating of the piece having the lesser electrical resistance before it is brought into contact with the piece having the greater electrical resistance.

The features of this invention will be more fully understood from the description of the accompanying drawing, forming a part of this specification, in which:—

Figure 1 represents a top plan view of one kind of an electric welding machine used with my process. Fig. 2 is a perspective view of the holding jaws.

1, 2, represent the two slides mounted on the gib-way 3, on the top plate of the machine. The slide 2 is movable by means of the toggle and lever mechanism 4, 5, respectively. The slide 1 carries the stock gripping members 14, 15, the slide 2 carries the stock gripping members 16, 17.

6 indicates the source of electrical energy, it being unnecessary to show a complete heat transformer, but the same is diagrammatically indicated by reference numeral $6^a$.

The wiring plan of the primary circuit is as follows:—from the source of electrical energy 6 by wire $7^b$ to stationary switch member 8, from movable switch member 9, by wire 7 to transformer $6^a$, and from transformer by wire $7^a$ to electrical source 6.

The wiring plan of the secondary circuit is as follows:—from transformer $6^a$ by wire $6^b$ to jaw 17, from transformer by wire $6^c$ to jaw 15. This circuit is completed by contacting the two pieces 18 and 19 to be welded, or by inserting the bridge 20 between the jaw 15 and the piece 19.

18 represents the piece of greater electrical resistance, held by the members 14, 15.

19 represents the piece of lesser electrical resistance, held by the members 16, 17, the adjacent ends of which pieces are to be welded.

20 represents a U-shaped bridge formed of a suitable electric conductor material, and adapted to be removably inserted between the two sets of jaws 14, 15 and 16, 17, respectively, so as to bridge around the exposed end of the piece of greater electrical resistance, the face of the bridge abutting against the end of the piece 19, which is to be preheated, because of its lesser electrical resistance. In this way, an electrical contact will be formed between the jaws 14, 15, and the end of the piece 19.

In carrying out my process, the pieces to be welded are inserted in the jaws, as described, the jaws being separated, the bridge 20 is inserted between the jaws, so as to hold the piece 18 out of electrical contact, the jaws on slide 2 being moved forward to bring the end of the piece 19 into contact with the front face of the bridge. The lever 12 is manipulated to direct an electric current through the circuit thus established, until the end of the piece 19 has been sufficiently preheated. The current is shut off, the bridge removed and the slide 2 moved forward to bring the ends of the pieces 18, 19, into firm contact, and the current is applied through the circuit thus formed and maintained until the two pieces have been securely welded together.

Having described my invention, I claim:—

1. The herein described process of welding stock, having different electrical resistance, which consists in directing the current from a single source of electric energy through the machine element holding the piece of greater resistance, and through the other piece to be welded, while the surfaces to be united are held out of electric contact, then contacting said surfaces and directing said current through the circuit thus formed.

2. The herein described welding process, for uniting metallic pieces having different electrical resistance, which consists in forming an electric circuit between the machine element holding the piece of greater resistance, and the other piece, while the surfaces to be united are out of contact, until the piece of lesser resistance is initially preheated, then forming an electric circuit through the contact of the surfaces to be united, and directing the current through the same to form a joint.

3. The herein described process of electrically welding two pieces of stock, having different electrical resistance, from a single source of electrical energy, which consists in first establishing a circuit through the element used for holding the piece of greater resistance and through the other piece, while the surfaces to be united are separated, and then bringing said surfaces together and electrically welding the same.

4. The herein described welding process for uniting stock of different dimensions, which consists in forming an electric circuit through the larger piece and through the machine element holding the smaller piece, while the surfaces to be united are out of contact, until the larger piece is initially preheated, then forming an electric circuit through the contact of the surfaces to be united and directing the current through the same to bring both pieces to the welding heat.

5. The herein described process of electrically welding pieces of metal, having different electrical resistance, which consists in inserting the pieces in the jaws of an electric welder, holding the pieces apart, establishing a circuit between the jaw holding the piece of greater resistance and the piece having the lesser resistance, directing a current through said circuit, and preheating the last-named piece, then bringing the pieces into contact, and directing a current through the same until a weld is formed.

6. The herein described process of electrically welding metal pieces, having different electrical resistance, which consists in inserting the pieces in the jaws of an electric welder, inserting a bridge between the jaws, to form a contact between the jaw holding the piece of greater resistance, and the piece of lesser resistance, directing a current through said circuit to preheat the last-named piece, then withdrawing the bridge and bringing said pieces into contact, and directing a current through the same to form an electric weld.

7. The herein described process of welding pieces of metal, having different electrical resistance, which consists in preheating one of the pieces while held in the jaws of an electric welder, by directing the current from a single transformer, through said piece and through the jaws used for holding the other piece to be welded, by inserting a piece of conductor material between said jaws and said piece, until the piece is sufficiently heated, then removing said conductor material and contacting the surfaces to be welded and directing the current through said surfaces to form a weld.

8. In an electric welder, work holding jaws, a source of electrical energy in circuit therewith, means for relatively moving said jaws, and a bridge adapted to be removably inserted between said jaws to establish electric contact between the jaw holding the piece to be welded of greater resistance and the piece of lesser resistance, whereby the last-named piece may be initially preheated, without heating the piece of greater electrical resistance.

In testimony whereof, I have hereunto set my hand.

NEIL MACNEALE.

Witnesses:
OLIVER B. KAISER,
CLARENCE B. FOSTER.